Figure 1:
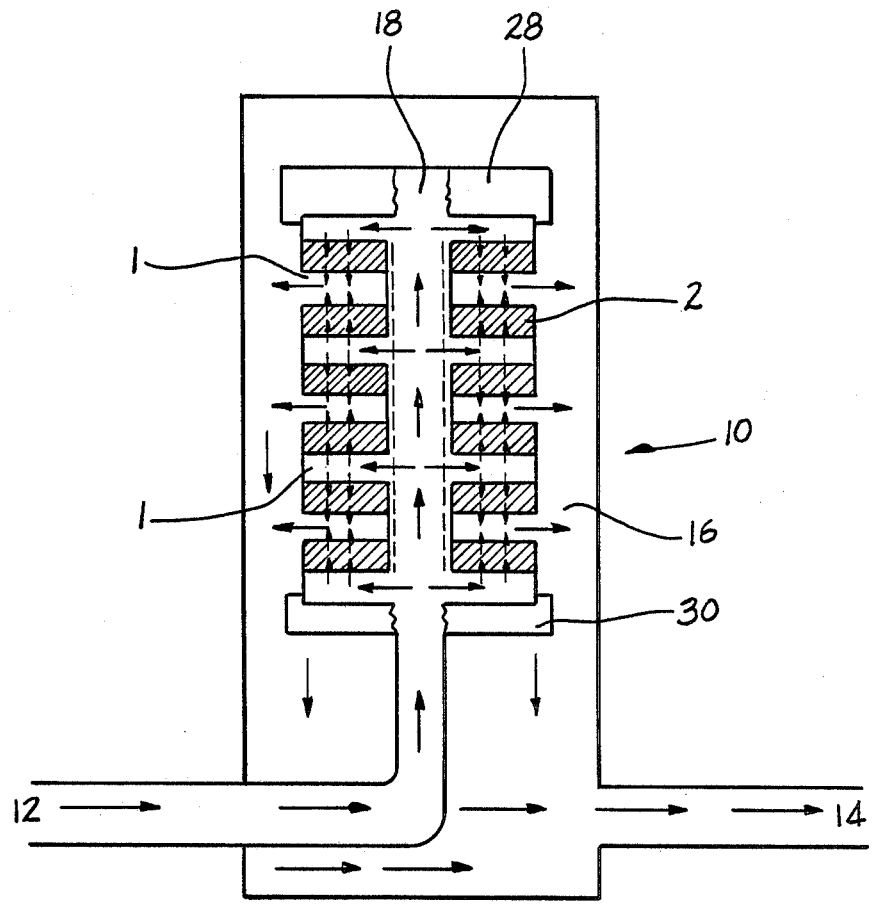

United States Patent [19]

Kemmelmeyer

[11] Patent Number: 4,801,382
[45] Date of Patent: Jan. 31, 1989

[54] FILTER MEANS WITH A SEGMENTAL CONSTRUCTION

[76] Inventor: Werner Kemmelmeyer, Veilchenstrasse 5, Thansau, Fed. Rep. of Germany, 8201

[21] Appl. No.: 897,340

[22] PCT Filed: May 2, 1985

[86] PCT No.: PCT/DE85/00137
§ 371 Date: Jul. 28, 1986
§ 102(e) Date: Jul. 28, 1986

[87] PCT Pub. No.: WO86/04254
PCT Pub. Date: Jul. 31, 1986

[30] Foreign Application Priority Data

Jan. 28, 1985 [DE] Fed. Rep. of Germany ....... 8502177

[51] Int. Cl.⁴ ............... B01D 29/16; B01D 29/26
[52] U.S. Cl. .................... 210/323.1; 210/346; 210/486; 55/484
[58] Field of Search ............ 210/331, 346, 486, 323.1; 55/511, 529, 484

[56] References Cited

U.S. PATENT DOCUMENTS

| | | | |
|---|---|---|---|
| 3,623,610 | 11/1971 | Olsen et al. | 210/346 |
| 3,702,659 | 11/1972 | Clark | 210/486 |
| 3,737,036 | 6/1973 | Kasten | 210/486 |
| 4,321,140 | 3/1982 | Luthi | 210/331 |
| 4,391,709 | 7/1983 | Schmidt, Jr. | 210/346 |
| 4,601,826 | 7/1986 | Christophe et al. | 210/346 |
| 4,626,351 | 12/1986 | Führing | 210/331 |
| 4,637,876 | 1/1987 | Dosoudil | 210/486 |

Primary Examiner—Richard V. Fisher
Assistant Examiner—Wanda L. Millard
Attorney, Agent, or Firm—Bachman & LaPointe

[57] ABSTRACT

The invention relates to a filter means for filtering gases, liquids or similar filtering media, preferably for process engineering plants, e.g. those for the foods and drinks industry, such as for compressed air preparation, particularly in sterile operation, optionally under overpressure conditions and/or at high temperatures, in which there is a segmental construction, formed by essentially circular filter elements, against which a flow can take place from the inside and outside, together with interposed, disk-shaped filter material and in which the entire edge area of the filter material sealingly cooperates with the filter elements.

20 Claims, 8 Drawing Sheets

FILTER MEANS WITH A SEGMENTAL CONSTRUCTION

The present invention relates to a filter means for filtering gases, liquids or similar filtering media, preferably for process engineering plants, e.g. those of the foods and drinks industries, such as for compressed air preparation, particularly in sterile operation, optionally under overpressure conditions and/or at high temperatures.

Very high demands are made on filter means for a field of use of the aforementioned type. Apart from an assured complete fulfilment of the necessary filtering requirements, it is necessary to ensure a reliable, troublefree operation, because a failure of the filter means not only leads to unusable products, but also to enormous stoppage losses in the plants in question.

Particularly during the production of foods and drinks, such as in breweries, apart from the above requirements, it is frequently also necessary to ensure that the filtering agents are absolutely sterile after passing through the filter means. If the filter means fails in sterile operation, which is not always immediately detectable, considerable production quantities can be rendered unusable.

In general, such filter means have a very wide range of application and apart from use for filtering out fuels from gases, e.g. for separating oil from compressed air, (oil separators), they are used e.g. for deionizing water, removing microorganisms from drinks, nutrient broths from fermenters and the like. Such filter means must withstand temperatures up to 200° C. and in part up to 300° C. and pressures in the range of 16 to 20 or even 30 bar. They must also not fail if the design capacity is under certain circumstances briefly exceeded, even by double or even treble.

A filter means of the aforementioned type and for the aforementioned purposes is e.g. described in DE-OS No. 3,125,001. As can be gathered therefrom, such a filter means essentially comprises a tubular, normally vertically positioned filter material, which is held in an inner and outer tube, which is e.g. constructed in screen-like manner. At the top and bottom, the filter material, which is also referred to as filter cartridge, is held by a cover plate. In order to ensure a reliable seal between the filter material and the cover plate, for reliably preventing filter perforation, the filter material is bonded to both the upper and lower cover plate (cf e.g. U.S. Pat. No. 4,157,968). In additiona, it is also known to weld the filter cartridges to the corresponding covers. Replacement is necessary at regular intervals because after a certain operating period there is increasing clogging of the filter material and the filtering capacity decreases, or an unacceptably high pressure drop occurs. As a result of the aforementioned bonding or welding, in the case of the known filter means, it is necessary to replace the complete filter element, including the upper and lower covers, as well as the inner and outer tubes supporting the filter material, said parts generally being made from a high-grade material, particularly stainless steel. Quite apart from a not inconsiderable labour time, such a replacement involves considerable costs, because the parts to be replaced in the known filter means are made from a very high-grade material, e.g. stainless steel, so that they have a very value compared with the actual part which is subject to wear, i.e. the filter material. However, for the aforementioned fields of application, only the aforementioned filter means have hitherto been used. Only in the motor vehicle field is an air filter known, which comprises a segmentally constructed filter element, in which filter material in disk-like form is maintained in spaced manner by spacer rings (cf German Patent No. 681,303). These spacer rings in each case comprise tube portions with different diameters, having alternatley inwardly and outwardly directed webs. The spacer rings are superimposed in a regularly alternating sequence with interposed filter material. Thus, air sucked in its deflected upwards or downwards by the spacer ring with the outwardly directed webs and in the vicinity of the spacer ring with the inwardly directed webs is sucked into the clean air line after the air has in this way been forced through the interposed filter material. Although this known filter means may well be satisfactory for use in cleaning the intake air for internal combustion engines, it is not suitable for the uses intended for the aforementioned filter means according to the invention. The spacer rings essentially only space the filter material, but do not lead to an adequate sealing of said material, which would permit a use of such filter means e.g. under sterile operating conditions. In the superimposed sequence between the spacer rings, there are in each case quadrant-shaped regions on the inside and outside, in which the filter material only rsts on one side on a spacer ring, but is not held in a sealing manner. There is no difficulty in bypasses or filter passages occurring here, particularly if, which is not provided in the filter means, the filtering medium is a liquid. Up to now, such a filter means has only been known as an air filter for internal combustion engines.

In view of the aforemention shortcomings of the known filter means of the present type, the problem of the present invention is to provide a filter means for filtering gases, liquids and similar filtering media, preferably for processing plants and the like which, without restriction with regards to the field of use, is easier to maintain and regenerate, whilst at least having the same operational reliability and filtering capacity.

Accordingn to the invention, this problem is solved by a filter means characterized by a segmental construction formed by substantially circuilar filter elements, against which a flow can take place from the inside and outside, together with interposed, disk-shaped filter material. The invention also teaches a filter means, which is characterized in that its entire edge area, the filter material sealingly cooperates with the filter elements.

Thus, the invention has recognised that the aforementioned filter means having a segmental construction and known from the motor vehicle field is fundamentally also suitable for the uses under consideration here. As a result of the teaching of sealing the filter material over its entire edge area with or with respect to the circular filter elements, it is possible to use this filter means in fields where it has hitherto only been possible to use filter means having filter cartridges.

As a development of the aforementioned teaching, the invention also teaches that each filter element has an inflow port and an outflow port, which are in each case constructed in an inner wall or an outer wall of the filter element. In accordance with the known "cartridge" filter means, the filter means according to the invention either has an incident flow from the outside, the "clean" medium then being drawn from the interior of the filter means, whose substantially double-tube construction is retained. In the case of the reverse flow direction, the filtering medium flows from the inside to the outside. With respect to the presently described flow direction, the term inner wall is used to define the terminating region of the filter element towards the inside, i.e. in the case of the known double-tube construction the area corresponding to the inner tube. In the same way, the outer wall designates the area coinciding with the larger diameter tube. The inflow port in the outer wall or the outflow port in the inner wall leads in each case to a clearly defined "chamber" being formed, into which in each case the filtering medium flows from the outside, is deflected and then passes through a filter medium above or below it. A thus formed chamber, which can have four outflow ports or inflow ports distributed over the circumference, is provided at the top and bottom with inner and outer through sealing edges or strips, against which the filter elements can be sealingly pressed so that it is not possible to circumvent the filter.

According to a further development, the invention teaches positioning upstream of the filter material in the flow direction of the filtering medium at least one screen or the like. This can fundamentally be obtained in that the screen is constructed in one piece with the filter material. However, in certain cases, the filter material per se may suffice, so that a screen is not then necessary.

If it is sufficient to have a screen arranged in the flow direction in front of the filter medium of holding back or filtering out coarse constituents there, it can still be appropriate for the filter material to be followed by a screen. As a result, the filter means can be used in a universal manner, because there is always a screen upstream of the filter material, independently of the flow direction. Such an arrangement also ensures that if the filter medium should tear, which is extremely rare, but still cannot be completely excluded, if extreme conditions act on the filter means as a result of a fault in the plant, no filter material can reach the "clean" side, because it is reliably held back by the screen provided behind the filter material in the flow direction.

The filter element of a filter means according to the invention can fundamentally be constructed in one piece, but only for as long as one screen is provided. From the manufacturing standpoint, it is recommended to produce the filter element in the form of an inner ring and an outer ring, which are interconnected by the screen. For this purpose, the inner and outer edges of the screen can be welded or bonded to the inner and outer ring. Particularly if a screen is to be arranged upstream and downstream of the filter medium, it is recommended that the screen be detachably connected with the inner and outer ring, e.g. by a screw coupling. Fastening e.g. by attachment screws could also be advantageous.

However, a special development of the inventive teaching is directed at lockably holding a screen in the outer ring. The screen, which is usually an extensible steel body, is pressed in this case into a locking slot in the outer ring and then rests on a corresponding surface or a corresponding all-round shoulder of the inner ring. In the case of two screens fixed in parallel spaced manner in the outer ring, it is possible to secure the inner ring only by positive engagement. Preferably, the clamping spacing of the screen is a little smaller in the outer ring than in the inner ring or then the spacing of the all-round shoulders of the inner ring, so that the screens simultaneously rest under pressure on the inner ring. Such a construction firstly leads to a very easy assemblability of the apparatus, because additional welding, bonding or screwing is unnecessary. In addition, between the inner and outer rings, there is a certain relative elasticity and displaceability, without the risk of the joining points, e.g. welding spots breaking up. This elasticity is of great significance for a reliable tight seal between the filter elements and the interposed filter media, as will be described in greater detail hereinafter.

Preferably, the filter material is also arranged in spaced manner with respect to the screens. Thus, to a limited extent the filter material can "work", so as to have space for expansions linked with temperature fluctuations.

It is of considerable importance for the sealing of the filter means, the sealing cooperation of the filter elements with the filter material is that with respect to all the filter elements and all the inner and outer rings thereof, the necessary pressure always prevails between adjacent filter elements, in order to ensure the sealing pressure of the filter material. Particularly if relatively thin filter material is used, which is also relatively slightly extensible, there can be a considerable reduction in the pressure between the outer or inner rings of the filter elements as a result of settling phenomena. To obviate this, the invention further teaches supporting at least one segment, preferably an end segment of the filter means, against the following segments by means of a rubber bead, e.g. an O-ring or a rubber bead with an upper circular cross-section and a lower rectangular cross-section for fitting in a slot. If settling phenomena occur between further segments, the mounting support of the segments can follow, as in the case of a compression spring and the pressure is maintained substantially unchanged. To the extent that the segments, as taught hereinbefore, comprise inner and outer rings, the inner and outer ring at the end segment preferably has such a rubber bead.

Quite apart from the importance of compensating settling phenomena, O-rings or rubber beads, etc can also be advantageous if the filter material is inelastic, such as e.g. a ceramic material. It is then recommended to place such O-rings or rubber beads between the filter material and the filter element, i.e. between the inner and outer rings.

It is also advantageous for holding together the filter elements to brace the upper and lower mounting supports of said elements with respect to one another by using a tie bolt. The tie bolt can e.g. be a longitudinal screw passed through the centre of the filter means and coinciding with the axis of the latter, whilst bringing about a reciprocal bracing of the upper and lower mounting supports for the segment.

A filter means according to the invention as described hereinbefore can fundamentally be operated with different filter materials. As the flow rate is also a function of the filter surface available, it is advantageous to house the maximum number of filter segments in a given area. An economic utilization of this area is aided by the relatively thin filter elements. To satisfy this requirement, the invention further teaches the use of plastic membranes as the filter material in filter means of the present type, particularly in a filter means with one or more of the aforementioned features. The starting material for such membranes is e.g. marketed under the trade mark GORE-TEX.

Such a filter material comprises a membrane, which is filter-active and a support material connected thereto.

As it is relatively easy to pass through the support material, which also applies with respect to the constituents to be filtered, which have just been held back in the filter-active membrane, it is necessary to fit such membranes in a specific manner in such a filter means, namely in such a way that the filtering medium initially flows through the filter-active membrane and then the support materials. Otherwise, the support material could lead to a "short-circuit", i.e. substantially unfiltered filtering medium reaching the "clean" side.

However, a special teaching of the invention is directed at using an at least three-layer membrane element, which correspondingly comprises a filter-active membrane, followed by a support layer and then by a further filter-active membrane. No matter the way in which such a membrane is fitted, a "short-circuit" cannot occur therewith.

It can also be advantageous to use a four-layer membrane element, which is formed from two two-layer membrane elements, which are interconnected in such a way that the support layers are in each case adjacent to one another. A particularly stable membrane element is then produced from the starting material.

As stated hereinbefore, it is of great significance for a filter means of the aforementioned type for it to be completely tight, i.e. excluding the filtering medium from in any way passing through the filter means without filtering, i.e. bypassing the filter material. It is of particular importance that the filter material, particularly in the case of a filter means as described hereinbefore, is held in a sealing manner between the filter elements, i.e. between the outer and inner rings. This can fundamentally be aided in that the outer and inner edges of the filter elements are surrounded with a sealing border.

Particular preference is given to providing the filter element with an inner and an outer bead at the time of production by a suitable pressing or shaping action.

Further details of the invention can be gathered from the subclaims, as well as the following description of embodiments relative to the attached drawings, wherein show:

FIG. 1 a basic representation of a filter means according to the invention.

Figure 2:
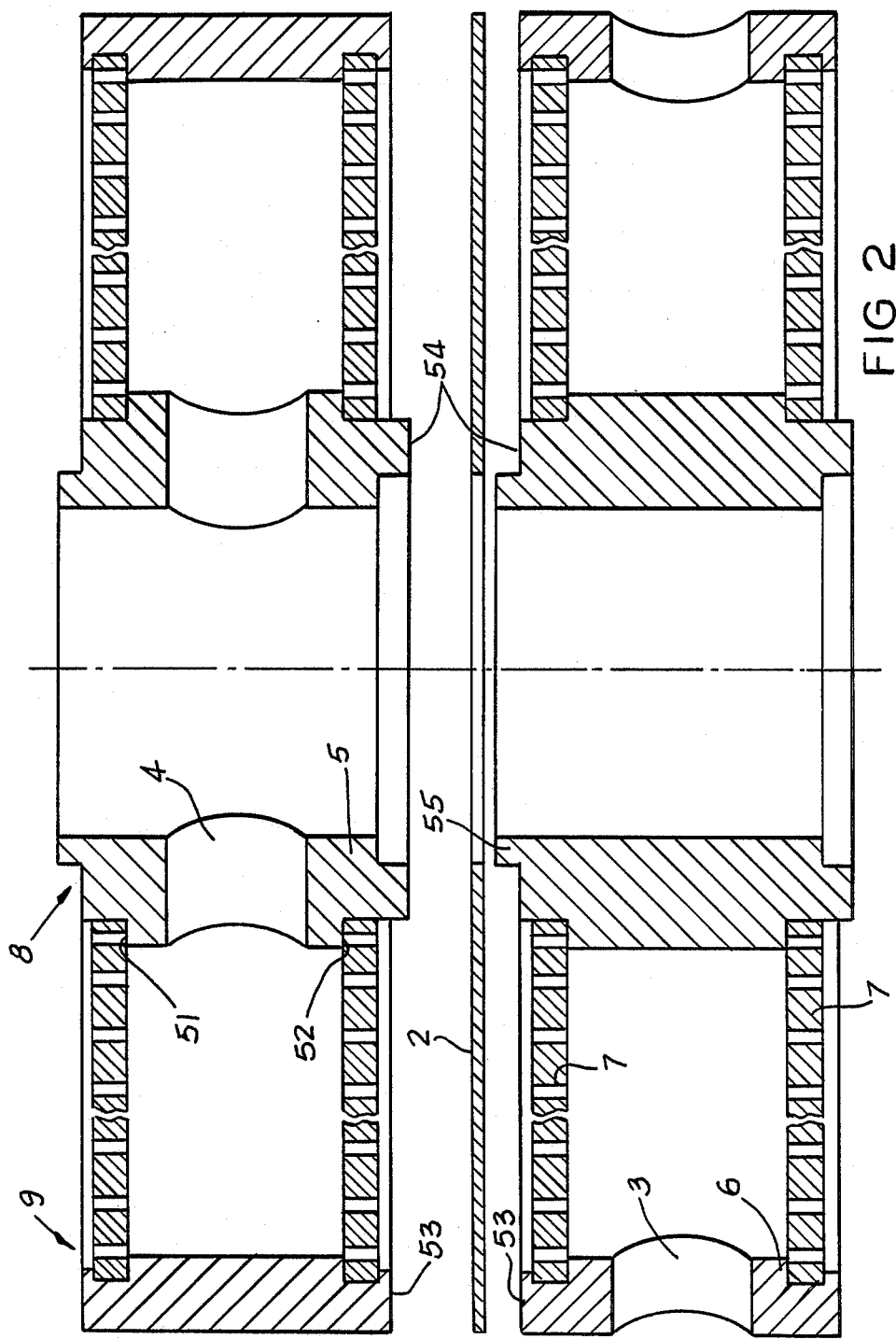

FIG. 2 two filter elements of a filter means according to the invention, as well as an interposed membrane element on a larger scale.

Figure 3:
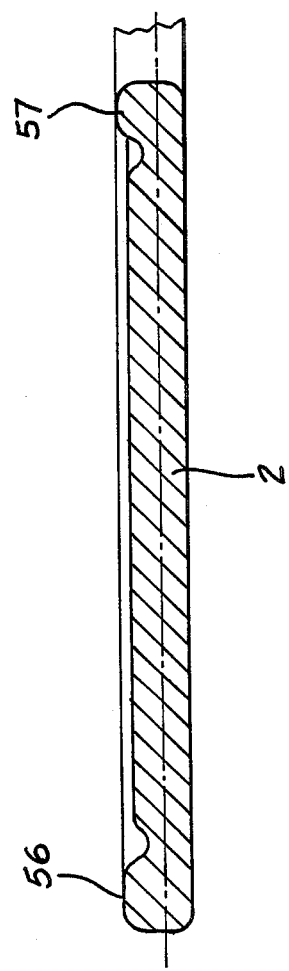

FIG. 3 in section, a larger-scale, half-side representation of a membrane element according to the invention.

Figure 4:
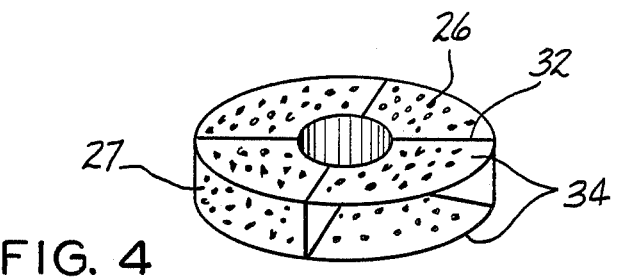

FIG. 4 an alternative embodiment of a filter element according to the invention.

Figure 5:
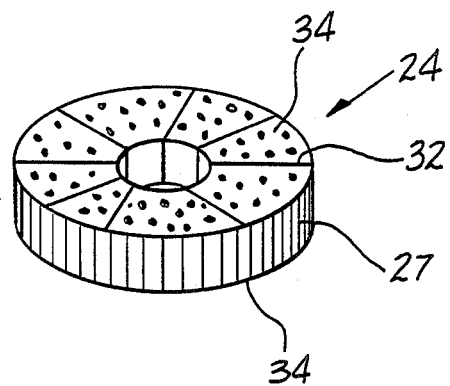

FIG. 5 a further alternative filter element, which is open to the inside and closed to the outside.

Figure 6:
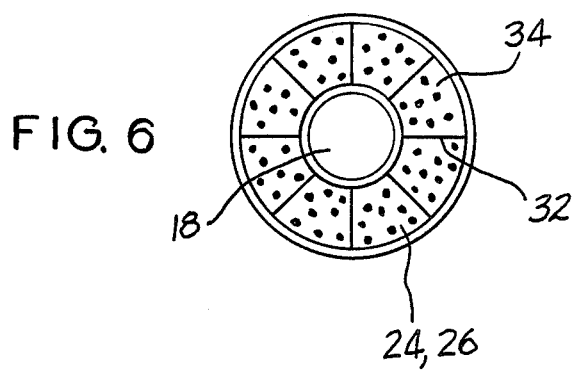

FIG. 6 a plan view of a filter element according to FIGS. 4 and 5 with support walls.

Figure 7:
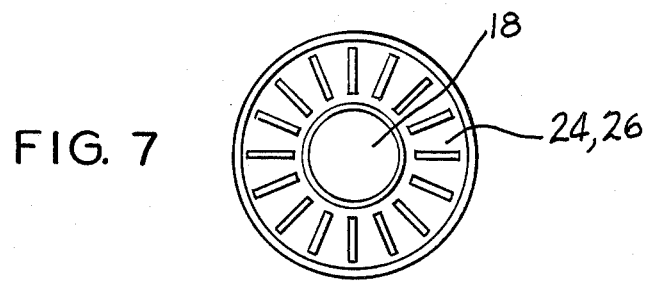

FIG. 7 a further alternative filter element with slot-like openings in the end faces.

Figure 8:
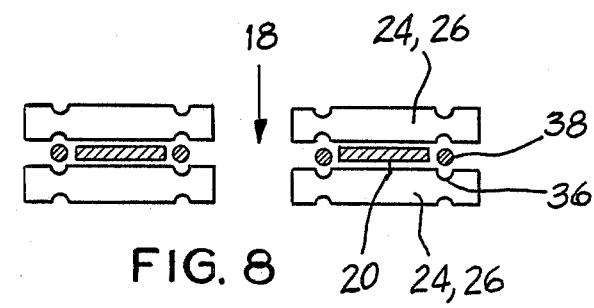

FIG. 8 a diagrammatic representation of two superimposed filter elements, in an alternative embodiment, with interposed filter material and annular sealing elements.

Figure 9:
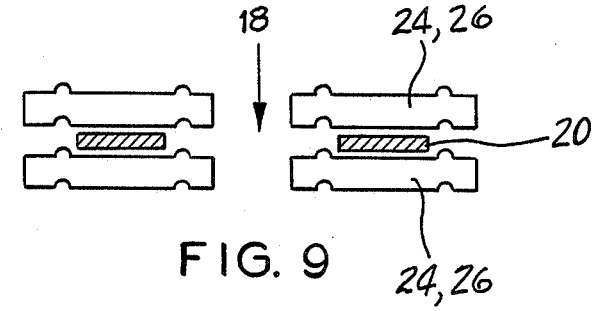

FIG. 9 a further embodiment of an alternative filter element, with an annular bead parallel to the inner and outer walls on one end face and with an annular depression parallel to the inner and outer walls of the other end face.

Figure 10:
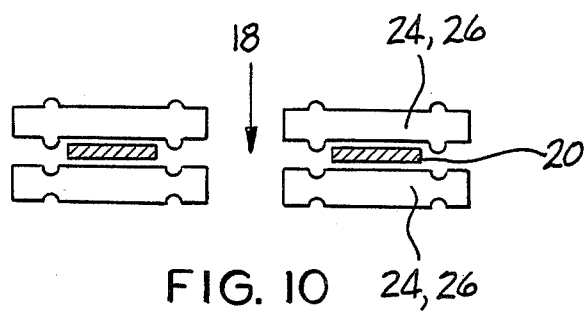

FIG. 10 a further alternative embodiment of filter elements, some only having bead-like projections, whilst the others only have depressions, in sectional form.

Figure 11:
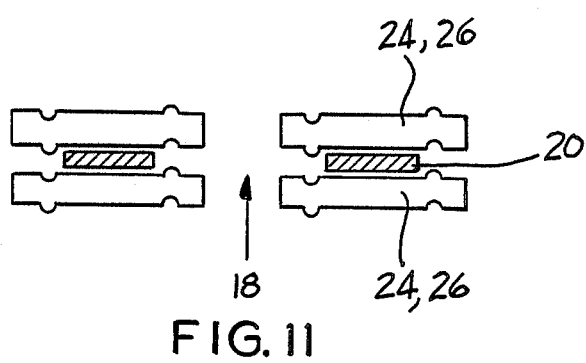

FIG. 11 another alternative construction of a filter element, a bead-like, annular sealing element and a groove-like sealing element being provided on the particular end face of the filter element, in section.

Figure 12:
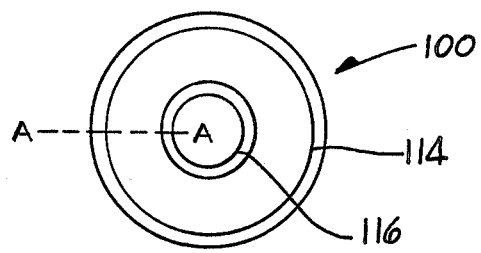

FIG. 12 a plan view of an alternative filter material set.

Figure 13:
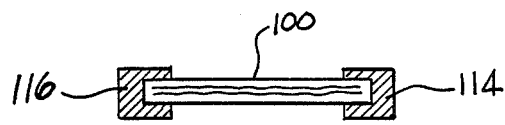

FIG. 13 a cross-section along line A—A in FIG. 12.

Figure 14:

FIG. 14 another alternative embodiment of a filter material set, a metal screen being used as the filter material sheet and sectioned along line A—A in FIG. 12.

Figure 15:
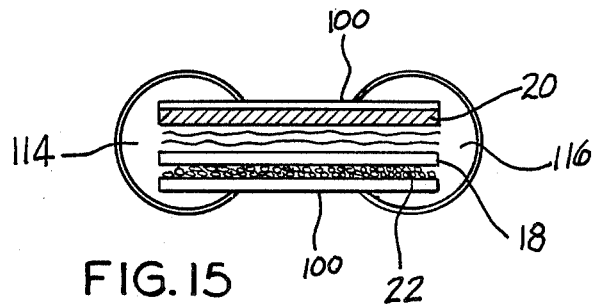

FIG. 15 a multilayer filter material set, sectioned along line A—A in FIG. 12.

Figure 16:
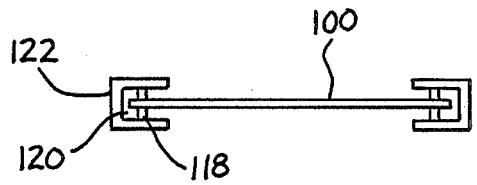

FIG. 16 a filter material set, in which the filter material is fixed by means of screws to multilayer borders, sectioned along line A—A in FIG. 12.

Figure 17:
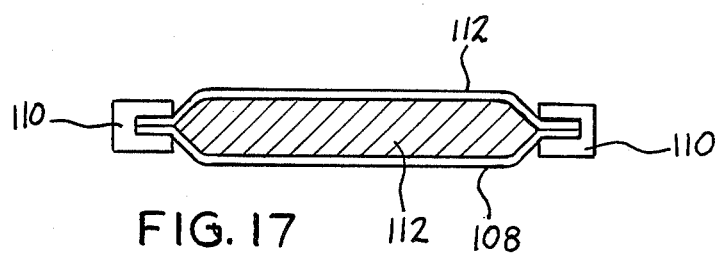

FIG. 17 an embodiment, in which the filter material is fixed in two borders by the application of pressure, sectioned along line A—A in FIG. 12.

Figure 18:
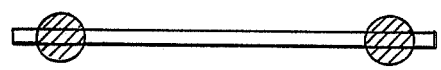

FIG. 18 another alternative embodiment in which the border or borders do not embrace the edge of the filter material set, sectioned along line A—A in FIG. 12.

Figure 19:
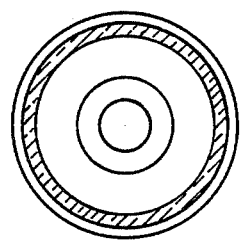

FIG. 19 a plan view of the filter material set of FIG. 18.

Figure 20:
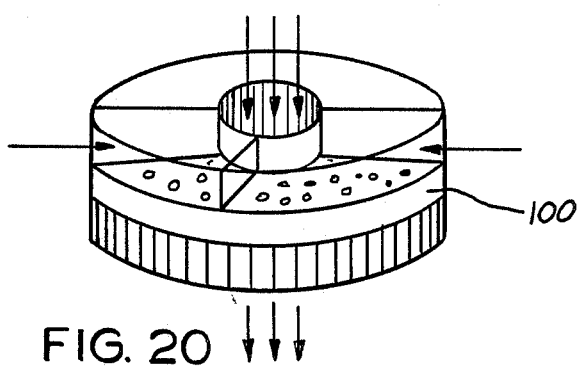

FIG. 20 a use of a filter material set in a filter means.

What is shown and described is a filter means 10 for filtering gases, liquids or similar filtering media in process engineering plants, as has been described hereinbefore.

FIG. 1 shows the filter means 10, the filtering medium passing through supply line 12 into filter means 10, then passes through the filter elements 1 and is then returned to the plant of which filter means 10 is one element through the discharge line 14. For illustration purposes, filter material 2 is shown on a much larger scale in the filter means 10 shown in FIG. 1. As can be seen, the filter elements 1 are partly closed towards the inside, i.e. towards the supply pipe 12 and in part have an opening to the latter.

In the embodiment shown in FIG. 1, the filtering medium flows through the openings of the filter elements 1 open towards supply pipe 12 and then, with a flow deflection of about 90° flows through the filter material 2 and accompanied by a further flow deflection of substantially 90° passes through further elements 1, which are open towards the outside, i.e. towards the clean medium area 16. As FIG. 1 also shows, the filter elements 1 are secured by upper or lower borders or protective covers 28, 30.

Although reference has previously been made to the filtering medium flowing from supply pipe 12 into the particular filter elements 1, it can be more clearly seen that supply pipe 12 issues into a filter inner line 18, which need not be a line in the physical sense and can instead be formed by filter elements open or not open towards the same.

As can be seen in FIG. 2, the filter means 10 according to the invention is constructed segmentally, namely by substantially circular filter elements 1, which comprise an outer ring 9 and an inner ring 8. In the embodiment of FIG. 2, outer ring 9 and inner ring 8 are held together by screens 7, which are positively engaged in the outer ring 9. Due to the fact that the screens 7 rest on the all-round shoulders 51, 52 of inner ring 8, the complete filter element 1 comprising outer ring 9, the two screens 7 and the inner ring 8 is held together.

As can also be seen in FIG. 2, the inflow ports 3 or outflow ports 4 are constructed in bore-like manner in the outer ring or inner ring. Thus, all-round sealing faces 53, 54 can be formed on outer ring 9 and also on inner ring 8 and the filter material 2 rests thereon. In this way, the filter material 2 is held in a completely sealing manner between the two filter elements 1, which in each case have corresponding sealing faces 53, 54 on their underside.

FIG. 2 only shows two outflow ports 4 or inflow ports 3, but preferably a filter element 1 has four outflow ports 4 or inflow ports 3.

FIG. 2 also shows that the filter material 2 resting on the sealing face 53, 54 is positioned in a spaced manner with respect to the upstream and downstream screens 6 when the filter means is assembled and the aforementioned advantages are consequently obtained.

What is not shown is that according to a further embodiment of the invention, an end filter element 1 can be provided with a rubber bead or an O-ring, so that said filter element cooperates with the filter element above it or below it. Although this rubber bead can fundamentally be provided in sealing face 53 and sealing face 54, it is also possible to construct the rubber bead on inner ring 8 in contact face 55 and in outer ring 9 in an outer region of sealing face 53, so that the positioning of filter material 2 on sealing faces 53, 54 is not disturbed. As a result of this rubber bead or this O-ring settling phenomena in filter means 1 are prevented and in certain circumstances, they could lead to leaks due to the reduction in pressure between the individual filter elements 1.

FIG. 3 shows half a filter membrane in cross-section and according to the invention this is used as filter material 2. This filter membrane is preferably a PTFE membrane and comprises three or four layers, whereof the central or the two central layers are support material layers, whilst the outer layers exert the actual filtering action. This has been described in greater detail hereinbefore. As is shown in FIG. 3, the filter material 2 or the filter membrane has an outer all-round sealing bead 56 and a corresponding inner all-round sealing bead 57, whose advantages have been described hereinbefore.

FIGS. 4 to 11 show alternative embodiments of the filter element 1, which will also be called filter segments hereinafter. As has been stated, for a filter means 10 according to the invention, two different filter elements or segments 1 are required.

The filter segment 26 of a first type shown in FIG. 4 is provided with openings toward the clean medium area 16 and they can have a random shape which is compatible with the stability of the filter segment. These openings permit a free outflow of cleaned material, which flows from the filter material into the outwardly open filter segment through the openings in the end face of filter segment 24 (FIG. 5). The second type of filter segment 24 is inwardly provided with openings, takes up the uncleaned material and passes it through openings in its end faces into the filter material 2. As this filter segment 24 is constantly exposed to contamination, it can prove necessary to separately clean these elements, or replace them or make from a material which is insensitive to the contamination. The outwardly open filter segments may requires less cleaning and can be made of a less expensive and less resistant material.

It is desirable for absorbing the pressure exerted on the filter segments to provide radial support walls 32 in the individual segments, which serve to prevent deformation of the segments in the direction of the main filter axis, which could cause leaks. The number of radial support walls 32 is not very critical, but for reasons of increased mechanical stressing, it can be advantageous to provide many more support walls than are shown in FIG. 6.

FIG. 7 shows a further possible construction of the openings in the end faces of the filter segments in the form of radial slots, which can be desirable for manufacturing, material or resistance reasons. The end faces of the filter segments can obviously also be provided with circular openings or openings of any other shape, the only limit placed on the size and shape of the openings being based on the stability of the filter elements.

It is necessary to seal filter material 2 against the inside and outside line. FIG. 8 shows a preferred embodiment in which annular beads are formed in both types of filter segments 24, 26 and in them can be placed ring-like sealing elements 38, between which the filter material 2 is introduced or inserted in sheet or disk form. This sealing element can be made e.g. of Teflon, silicone, rubber, etc, as a function of the materials to be cleaned.

FIG. 8 shows a preferred embodiment of the seal, whereby the filter segments have bead-like, annular depressions on one end face, whilst the segment surface has protuberances which on compressing the two filter segments engage with one another in such a way that a seal is achieved between the depression and the bead and the filter material 20 embedded between the filter segments 24, 26 is sealed against the inner and outer line.

FIG. 10 shows a filter, in which the material to be cleaned flows from the outside to the inside through the filter and in which equivalent parts are given the same reference numerals.

To give an idea of rough dimensions, but which are not intended to restrict the scope of the invention, the internal diameter of the filter inner line of conventional tubular filters is between 3 and 15cm, whilst the length of conventional tubular filters can be between 2 and 100cm. The embodiment according to the invention is not restricted to these dimensions.

An example of filter elements as shown in FIG. 1 are oil separators, water separators, ion exchangers and the like.

The embodiment shown in FIG. 10 is e.g. suitable for sterile filters.

FIGS. 12 to 20 show different embodiments of a membrane element or a filter material set.

As shown in FIG. 12, a sealing border is provided for sealing a membrane element or a filter material disk on the edge are of a circular filter material disk and as shown in FIGS. 13 or 14, it is made from a material differing from that of the filter material sheet and is preferably an elastic material, such as rubber, plastic, etc. By applying pressure at right angles to the main extension direction of the filter material a seal is obtained by compressing the material.

If planar surfaces are available as sealing surfaces for surface sealing purposes, then, as shown in FIG. 13, a rectangular or parallelepipedic construction of the sealing borders 114 or 116 can be advantageous.

However, it can be advantageous to have a circular, elliptical or round cross-section of such borders 116, 114, as shown in FIG. 1 relative to the example of a surface filter represented as a screen.

FIG. 15 shows an embodiment, in which different layers are reinforced by intermediate back cloth and are then fixed by polymerized-on borders. There is an alternation between back cloth layers 108 on the one hand and filter fleece 20 and filter resin 22 on the other.

As shown in FIG. 16, it can be useful for particularly high pressures, if a tear-resistant filter material sheet is fixed by known mechanical fixing devices. In this case, screws 118 are placed through the filter material sheet 100 and a metal bordering part 120 for fixing said sheet. A further elastic layer 122 surrounds the metal core, in order to ensure a better seal. As a result of such a fixing of the filter material sheet, a puncturing of the filter is prevented and a better fixing thereof ensured.

FIG. 17 shows a particularly preferred embodiment of the filter material set according to the invention, in which a loose filter material provided at the top and bottom with a back cloth is held by the clamping action of two covers 110.

FIGS. 18 and 19 show further embodiments of a filter material according to the invention, in which the borders are fitted in spaced manner from the outer most edge of the filter material disks. This maintaining of the spacing can e.g. be necessary, if such an application permits a better penetration of the material with the sealing or bordering material or a better mechanical strength of the sealing connection can be obtained, particularly with respect to pressure action.

FIG. 20 relates to the use of the filter material set according to the invention in a filter means for filtering gases and liquides. The medium to be filtered passes through the upper filter segment in FIG. 20 through open side walls of the filter segment disk, passes through the perforation in the segment bottom into the underlying filter material set 100 and leaves it in filtered form in another identical filter segment, which is open towards the filter inner line and closed towards the filter outer line and also has perforations in its two end walls towards the filter inner line. Such filter arrangements can be stacked at random levels, the filter material set must be sealed against the filter segments in order to achieve a satisfactory filtering action.

It is also pointed out that in FIG. 17 reference numeral 112 designates a surface filtration filter material sheet.

The features of the invention disclosed in the above description, drawings and claims can be essential for the realisation of the different embodiments of the invention either singly or in random combination.

The disclosure of the enclosed copies of the Applicant's earlier application "enclosure 1" and "enclosure 2" is fully incorporated into the description of the present invention.

I claim:

1. A filter for filtering gases, liquids and similar media, comprising a segmental construction formed by: at least two circular filter elements (1) against which a flow can take place from the inside and outside and at least one disk-shaped filter materila (2); each said filter element comprising an inner ring, an outer ring, at least one member connecting said rings, and a fluid port in one of said rings; each said disk-shaped filter material being positioned intermediate two adjacent ones of said filter elements and being supported by said two adjacent filter elements; said filter material having substantially its entire edge area in sealing cooperation with the adjacent filter elements (1); and said filter material and said adjacent filter elements defining a flow path for a medium to be filtered in which said medium enters through said fluid port in the inner ring or the outer ring of one of said adjacent filter elements, passes through said filter material between said adjacent filter elements, and exits through said fluid port in the inner ring or the outer ring of a second one of said adjacent filter elements.

2. A filter according to claim 1 further characterized in that segments (24, 26) of the filter element are annular and have support walls (32) running radially to the axis of the inner line (18) and at right angles to end faces (34) of the segments.

3. A filter according to claim 2 further characterized in that the filter elements are each provided on the end faces with two beads parallel to the inner and outer walls (27, 29) of the segments.

4. A filter according to claim 3 characterized in that the filter elements (24, 26) each have two annular depressions on the end faces (34), said depressions running parallel to the outer wall (27) and the inner wall (29) of the segment and being constructed to sealingly engage with the bead of an adjacent filter element.

5. A filter according to claim 2 further characterized in that at leat one said end face (34) has openings in the form of at least one of holes, slots, and screens.

6. A filter according to claim 1 wherein said filter material comprises plastic membranes.

7. A filter according to claim 6 wherein said plastic membranes are PTFE membranes.

8. A filter according to claim 6 wherein each siad membrane has at least two layers.

9. A filter according to claim 6 wherein each said membrane has at least three layers.

10. A filter according to claim 1 further characterized in that said at least one member connecting said rings comprises a screen (7) locked in at least one of the outer ring (9) and the inner ring (8).

11. A filter according to claim 10 further characterized in that each said filter material (2) is arranged in spaced manner with respect to the screen (7).

12. A filter according to claim 1 characterized in that at least one said filter element is supported against an adjacent filter element (1) by means of at least one of a rubber bead and an O-ring.

13. A filter according to claim 12 further characterized in that each said filter element ring has at least one of said rubber bead and said O-ring.

14. A filter according to claim 1 further characterized in that the filter material is formed from a non-reusable material.

15. A filter according to claim 14 wherein the filter material is selected from the group consisting of paper, cellulose, felt, leather, asbestos, sawdust, pumice and titanium dioxide.

16. A filter according to claim 1 further characterized in that the filter material (2) is a regeneratable material.

17. A filter according to claim 16 wherein the filter material is selected from the group consisting of glass, Teflon, porcelain, synthetic resin ion exchangers and metal.

18. A filter according to claim 1 further characterized in that at least one screen (7) is positioned upstream of each said disk-shaped filter material in the flow direction of the medium to be filtered and in that said at least one screen forms said at least one member connecting said rings in said one adjacent filter element.

19. A filter according to claim 1 further characterized in that each said disk-shaped filter material is followed by at least one screen (7) which forms said at least one member connecting said rings in said second one of said adjacent filter elements.

20. A filter according to claim 1 wherein said filter is used in a process engineering plant for compressed air preparation under at least one of sterile operating conditions, overpressure conditions and high temperature conditions.

* * * * *